US006986134B1

(12) United States Patent
Foster

(10) Patent No.: US 6,986,134 B1
(45) Date of Patent: Jan. 10, 2006

(54) LIGHTWEIGHT GLOBAL DISTRIBUTION MECHANISM

(75) Inventor: Gary D. Foster, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/270,141

(22) Filed: Mar. 16, 1999

(51) Int. Cl.
*G06F 9/445* (2006.01)
(52) U.S. Cl. .................................................... 717/177
(58) Field of Classification Search ................ 717/177; 713/181; 709/224, 226, 221, 204, 202; 340/7.48, 340/7.46; 705/14
See application file for complete search history.

(56) References Cited

U.S. PATENT DOCUMENTS

| 4,999,806 | A | * | 3/1991 | Chernow et al. ............ 717/177 |
| 5,790,796 | A | * | 8/1998 | Sadowsky ................... 709/221 |
| 5,835,911 | A | | 11/1998 | Nakagawa et al. ......... 707/203 |
| 5,859,969 | A | * | 1/1999 | Oki et al. ................... 709/200 |
| 5,892,909 | A | * | 4/1999 | Grasso et al. .............. 709/201 |
| 5,933,647 | A | * | 8/1999 | Aronberg et al. ........... 717/178 |
| 5,953,533 | A | * | 9/1999 | Fink et al. .................. 717/175 |
| 6,049,671 | A | * | 4/2000 | Slivka et al. ............... 717/173 |
| 6,115,549 | A | * | 9/2000 | Janis et al. ................. 717/172 |
| 6,123,737 | A | * | 9/2000 | Sadowsky ................... 717/173 |
| 6,151,643 | A | * | 11/2000 | Cheng et al. ................ 710/36 |
| 6,192,518 | B1 | * | 2/2001 | Neal .......................... 717/175 |
| 6,457,076 | B1 | * | 9/2002 | Cheng et al. ................ 710/36 |
| 6,496,977 | B1 | * | 12/2002 | Hamilton et al. ........... 717/168 |
| 6,516,340 | B2 | * | 2/2003 | Boys .......................... 709/204 |
| 6,546,488 | B2 | * | 4/2003 | Dillon et al. ............... 713/181 |
| 6,557,054 | B2 | * | 4/2003 | Reisman ..................... 710/33 |
| 6,574,657 | B1 | * | 6/2003 | Dickinson ................... 709/203 |
| 6,594,692 | B1 | * | 7/2003 | Reisman ..................... 709/219 |
| 6,611,862 | B2 | * | 8/2003 | Reisman ..................... 709/217 |
| 6,631,496 | B1 | * | 10/2003 | Li et al. ................... 715/501.1 |
| 6,633,910 | B1 | * | 10/2003 | Rajan et al. ................ 709/224 |
| 6,647,411 | B2 | * | 11/2003 | Towell et al. .............. 709/213 |
| 6,654,746 | B1 | * | 11/2003 | Wong et al. ................. 707/10 |
| 6,658,464 | B2 | * | 12/2003 | Reisman ..................... 709/219 |

FOREIGN PATENT DOCUMENTS

| EP | 864972 | 9/1998 |
| WO | WO 96/24231 | 8/1996 |
| WO | WO 96/32679 | 10/1996 |
| WO | WO 98/07085 | 2/1998 |
| WO | WO 98/18076 | 4/1998 |

OTHER PUBLICATIONS

"The Internet Unleased", SAMES Publishing, published 1994, pp. 468-525.*
"PUSH Technologies for Dummies", Bud Smith, pp. 179-266, published 1997.*
"Using the Windows 95 Registry", Jerry Honeycutt, pp. 11-15, 1996.*
Communications of the Association for Information Systems, PULL and PUSH Technologies, J.E. Kendall et al, published 1999.*
"Scheduled Activity", John Raithel, Linux Journal vol. 1996, Issue 26es, Jun. 1996, pp. 1-6.*
Keeping Your PC Trouble-Free Part I Software Programs and Utilities, Michael Devitt, Dynamic Chiropractic, May 4, 1998, vol. 16, Issue 10, p. 1-5.*
Cybermedia Oil Change 2.5, Ash Nallawalla, PC Update Online, 2 pages, Aug. 1998.*
Your Call is Important to Them, Mathew Lake, New York Times, Section G, p. 1, col. 2, Nov. 12, 1998.*
Webseeker Performs Detailed Searches; Symantec's Internet FastFind, The ForeFront Group's WebSeeker 2.1, Web search software, Software Review; Evaluation, Jim Rapoza, PC Week, No. 48, vol. 13, p. 103, ISSN 0740-1604, Dec. 2, 1996, 3 pages.*
Consider Shifting From Automatic to Manual in Updating Programs, The Houston Chronicle, Aug. 28, 1998, 2 pages.*
Oil Change, version 2.5, WinPlanet Windows Software Reviews and Downloads, Jun. 25, 1998, 5 pages.*
CyberMedia Oil Change 2.5, Bug Net, 1999, 9 pages.*
Update Your Software While You Sleep, Paul M. Eng, Business Week, Jun. 17, 1996, 2 pages.*
PCS, The Morning Groundhog, Jun. 1997, 3 pages.*
Beware of Becoming a Designer Cyber Guinea Pig, Janet Patterson, Business Times, Jan. 17, 1999, 3 pages.*
Call Windows 98 an Upgrade Not a Leap Forward, Lawrence J. Magid, PC Focus, Jun. 22, 1998, 3 pages.*
Is Windows 98 A chip off the Old Block, Lawrence J. Majid, Los Angeles Times, Dec. 22, 1997, 3 pages.*
Lowdown on Software Upgrades: Saving time, Money, Lawrence J. Magid, Los Angeles Times, Nov. 2, 1998, 2 pages.*
Plugged In, the Software Dilemma, Bob O'Donnell, Oct. 27, 1997, 3 pages.*

(Continued)

*Primary Examiner*—Todd Ingberg
(74) *Attorney, Agent, or Firm*—Lahive & Cockfield, LLP

(57) ABSTRACT

A lightweight global distribution mechanism distributes packages within a distributed system. The packages may hold any type of content and may hold contents such as patches, programs, documents or files. The distribution mechanism is lightweight in that it incurs minimal computational and memory overhead. With the distribution mechanism, a package index that identifies packages for installation is stored at a publishing master. Client systems may access and analyze the package index to determine which packages to install. The client systems may hold subscription lists that identify the packages to which the clients subscribe. The packages need not be stored at the publishing master but rather may be stored at separate repositories.

29 Claims, 12 Drawing Sheets

OTHER PUBLICATIONS

Symantec's Internet Fastfind, Linda L. Rosenbaum, 1996, 5 pages.*

Mc Afee Total Protection For Your PC, McAfee Oil Change, User's Guide, May 1999, pp. 1-26.*

"Cybermedia Keeps Computer Blues Away With a Free Oil Change", Dec. 22, 1997, Canada News Wire, 3 pages.*

"Keeping Your System Tuned to the LTEST Upgrades Pay Services Can Help Them For You, Though Many Can be had for Free", Chuck Melvin, Plain Dealer, Jun. 8, 1998, 4 pages.*

"Check Oil Change for Software Updates", Douglas D. Armstrong, Jun. 22, 1998, 2 pages.*

"Oil Change, TuneUp swerve in Different Directions", Earl Greer, InfoWorld, Dec. 1, 1997, 3 pages.*

Broderbund Brings In Cybermedia's Oil Change Automatic Update Technology to Enhance Customer Enjoyment of its Game Software, Nov. 26, 1997, Canada News Wire, 3 pages.*

Cybermedia and Trend Micro Join Forces to Integrate World Class Anti-virus Protection Into Cybermedia Product Line, Sep. 3, 1997, Canada News Wire, 3 pages.*

Keeping Your PC Fine Tuned and Ready To Go, Jeff Rickard, Toronot Sun, Aug. 13, 1997, 1 page.*

New Version of CyberMedia Oil Change Updates Your PC Automatically—Even While You Sleep, Jun. 17, 1997, PR Newswire, 3 pages.*

"Local Oil Change Will Clean Up", Lin Pao-Lo, The Australian, Mar. 11, 1997, 2 pages.*

"Update Your Tax Software Automatically With Free Tax-Season Version of CyberMedia's Best-Selling Oil Change Software", Mar. 3, 1997, Business Wire, 3 pages.*

An Oil Change Will Help Your Windows 95 Aplications Run Smoothly: Software Review, Computer Shopper, Mar. 1997, 2 pages.*

Windows 95 Application Update Utility, Lubricate Your System with Oil Change, Joe Peschel, Dec. 16, 1996, 3 pages.*

CNET Reviews. Pointcast [online]. CNET, Inc. (Feb. 26, 1997). Retrieved from the Internet Aug. 16, 1999: http://www.cnet.com/content/reviews/compare/push/ss02f.html; pp. 1-3.

Netcenter Reviews by CNET. Push Me, Pull You—How It Really Works [online]. CNET, Inc. 1995-1998: http:www.cnet.com/computing/swreviews/comparisons/push/ss04.html; pp. 1-2.

Internet Explorer HTML Support. Client Pull [online]. Microsoft Corporation. 1996: http://roo.ozware.com/~loffer/htmlinfo/clientpl.htm, p. 1.

"Remote driven remote file update" *IBM Technical Disclosure Bulletin*, US IBM Corp. New York, 40(1):237-238 (1997).

Network Working Group, "RFC 977-Network News Transfer Protocol", http://www.faqs.org/rfcs/rfc977.html, retrieved Apr. 5, 2004, 21 pages, Feb. 1986.

* cited by examiner

| Name | Version | Type | Location |
|---|---|---|---|
| coyote | 2.0 | 0 | http://www.arizona.com/coyote |
| roadrunner | 1.2 | R | http://www.arizona.com/roadrunner |
| rocketskates | 1.0 | P-wecoyote | ftp://ftp.acne.com/beta/rocketskates |
| dynamite | 1.1 | 0 | location1, location2, location3 |
| | | | |

Package Index, 60

*Fig. 4*

Subscription List, 114

| Package1 |
|---|
| Package4 |
| Package5 |
|  |

*Fig. 9*

| Package | Repository Server | Errors |
|---|---|---|
| Package1 | Repository2 | None |
| Package5 | Repository1 | Insufficent Memory |
| | | |

Notification, 130

*Fig. 11*

LIGHTWEIGHT GLOBAL DISTRIBUTION MECHANISM

TECHNICAL FIELD

The present invention relates generally to data processing systems and more particularly to a lightweight global distribution mechanism.

BACKGROUND OF THE INVENTION

In a distributed system there is often a need to distribute packages to various computer systems within the distributed system. These packages may contain programs, patches, documents or other files. In conventional systems, distribution requires the computer systems to register with a master to identify what packages are to be distributed to the respective computer systems. The master then issues a publishing event indicating that a package is available, and the package is distributed to the parties that registered for the package.

Unfortunately, this conventional approach suffers from some drawbacks. For example, there is a great deal of overhead incurred in providing support for the registration. A registry must be maintained, and resources must be provided to enable the computer systems to register with the master. In addition, there is no mechanism for a computer system to anonymously install packages as needed.

SUMMARY OF THE INVENTION

The present invention addresses the limitations of conventional systems by providing a lightweight global distribution mechanism for distributing packages. The present invention provides a distribution mechanism that does not rely upon registration, and thus, does not incur the overhead associated with maintaining a registry. In addition, the present invention allows clients to anonymously download or install the packages. The present invention is platform independent such that it may be practiced on a number of different types of platforms.

In accordance with one aspect of the present invention, a method is practiced in a distributed system that includes a publishing master and a client system. The publishing master is provided with an index of available packages for loading. The packages may take many forms, including the form of a patch, a document or a hypertext markup language (HTML) file, for example. The index is accessed on behalf of the client system to identify at least one selected package for installation at the client system. The selected package is then loaded on the client system. The selected package may be loaded without registration of the client system with the publishing master, and the publishing master may be unaware of the loading of the selected package at the client system.

In accordance with a further aspect of the present invention information that identifies packages that may be installed at a client is stored at a server. Data that identifies packages to which the client subscribes is stored at the client. The information identifying the packages that may be installed at the client and the data that identifies packages to which the client subscribes are used to determine which of the packages are to be installed at the client.

In accordance with a further aspect of the present invention, a method is practiced in a computer network that has a server and a client. In accordance with this method, data is provided at the server regarding what packages are available. An itemization of packages to which the client subscribes is provided at the client. The following steps are then repeated multiple times: data is accessed regarding what packages are available, and data is accessed regarding the itemization of packages to which the client subscribes to determine what selected packages to load and subsequently the selected packages are loaded at the client. The steps that are repeated multiple times may be repeated at periodic intervals or upon demand by a user.

In accordance with an additional aspect of the present invention, a distributed system comprises a publishing master that holds an index of packages that are available for installation and a repository for storing the packages that are available for installation. The distributed system also includes a client computer system for identifying selected packages among the packages indexed by the index of the packages. The client computer system obtains the selected packages from the repository and installs the selected packages.

In accordance with another aspect of the present invention, a method is practiced in the distributed system having repositories for storing packages. A selected package is provided on multiple repositories. Response times are determined from the repositories in which the selected package is provided. The selected package is then retrieved from the repository that has the shortest response time. As test communication may be used to assist in determining response times.

In accordance with yet another aspect of the present invention, a method is practiced by a client system within a distributed system. The distributed system includes a publishing master that has an index of packages available for installation. At least a portion of the index is requested from the publishing master. This portion of the index is received at the client system and processed to identify a selected package to install. Subsequently, a copy of the selected package is obtained and the selected package may then be installed.

In accordance with a further aspect of the present invention, a method is practiced in a distributed system that has a client and a storage holding packages that are available for downloading. Data is obtained that identifies packages that are available for downloading. The packages to which the client subscribes are identifies as are the packages that are already downloaded on the client. Selected packages are then downloaded to the client from the storage. The selected packages are those which are identified for installation, identified as packages to which the client subscribed and identified as not yet being downloaded to the client.

BRIEF DESCRIPTION OF THE DRAWINGS

An illustrative embodiment consistent with the principles of the present invention will be described below relative to the following drawings.

FIG. 4 depicts the format of a package index.

FIG. 9 depicts an example of a portion of a subscription list.

FIG. 11 depicts the logical organization of an exemplary notification.

DETAILED DESCRIPTION OF THE INVENTION

The illustrative embodiment provides a lightweight global distribution mechanism. The distribution mechanism is global in that all of the client computer systems within a distributed system may be serviced using this mechanism. The mechanism is lightweight in that it requires minimal overhead. No registration is used and no registry is maintained. The distribution mechanism is anonymous in that a client computer system may install packages unbeknownst to a publishing master.

Figure 1:
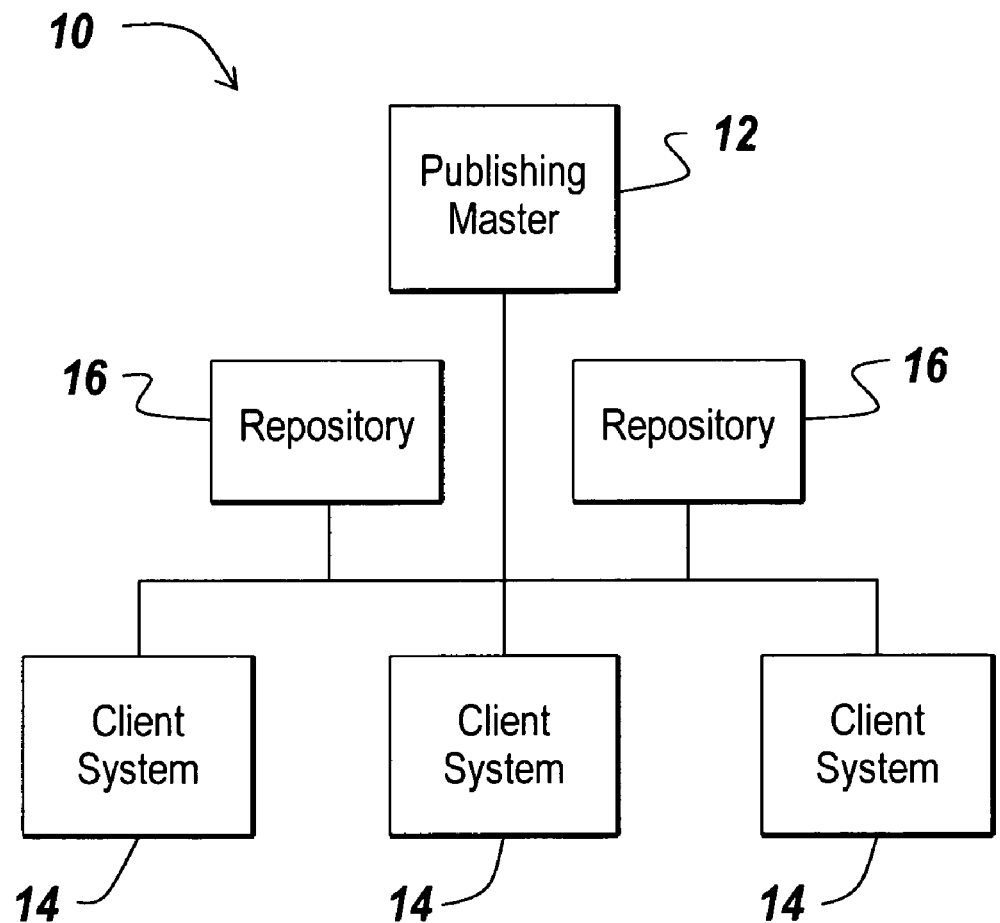
FIG. 1 depicts a block diagram of a distributed system that is suitable for practicing the illustrative embodiment.

FIG. 1 depicts an example of a distributed system 10 that is suitable for practicing the illustrative embodiment. Those skilled in the art will appreciate that the depiction in FIG. 1 is intended to be merely illustrative and not limiting of the present invention. The present invention may be practiced in environments that use a different number of repositories, client systems and publishing masters than shown in FIG. 1. In addition, different interconnection arrangements may be provided while still practicing the present invention.

The distributed system 10 includes a publishing master 12. The publishing master 12 is responsible for maintaining a package index that serves as an index of packages that are available for installation. This index itemizes the packages that may be installed at the client systems 14. The publishing master 12 may be a dedicated server computer system. Alternatively, the publishing master may be realized as a process that runs on a computer system along with other processes. Those skilled in the art will appreciate that the publishing master may be implemented using a variety of different types of computer systems including personal computers, workstations, mini-computers or mainframe systems.

The client systems 14 are computer systems on which the packages may be installed or downloaded. A "package," as used herein, refers to a logical quantity of information that may be encapsulated and sent to a client system 14 for installation. A package may contain one or more computer programs, patches, documents, data, records, HTML files or the like. In general, a package may contain any information that is useful for distribution to the client systems 14 within the distributed system 10. As used herein, a "patch" is a section of computer program instructions that is provided to update or repair a deficiency in an existing routine or program. The patches may provide additional features or functions to an existing version of a program between releases of versions of the program. The client systems 14 may take many forms. For example, the client systems 14 may be realized as personal computer systems, as server computer systems, as workstations, as network computers, as intelligent digital devices or as other types of devices. The client systems 14 are the entities on which the packages are installed. Thus, if a package contains a patch, the client system 14 receives the patch and installs the patch therein.

The distributed system 10 may include one or more repositories 16. The repositories 16 may be realized as generic storage servers. The packages that are indexed by the package index are stored on the repositories 16. A single package may be stored on multiple repositories 16. As will be explained in more detail below, the client systems 14 may obtain packages from the repositories 16 and download and/or install them.

The distributed system 10 may be a web-based system, such as the Internet, an intranet or an extranet. In such a case, the publishing master 12 may be realized as a web server that provides the client systems 14 access to the publishing index. The repositories 16 support anonymous File Transfer Protocol (FTP) and/or Hypertext Transfer Protocol (HTTP) access to the packages stored therein.

Figure 2:
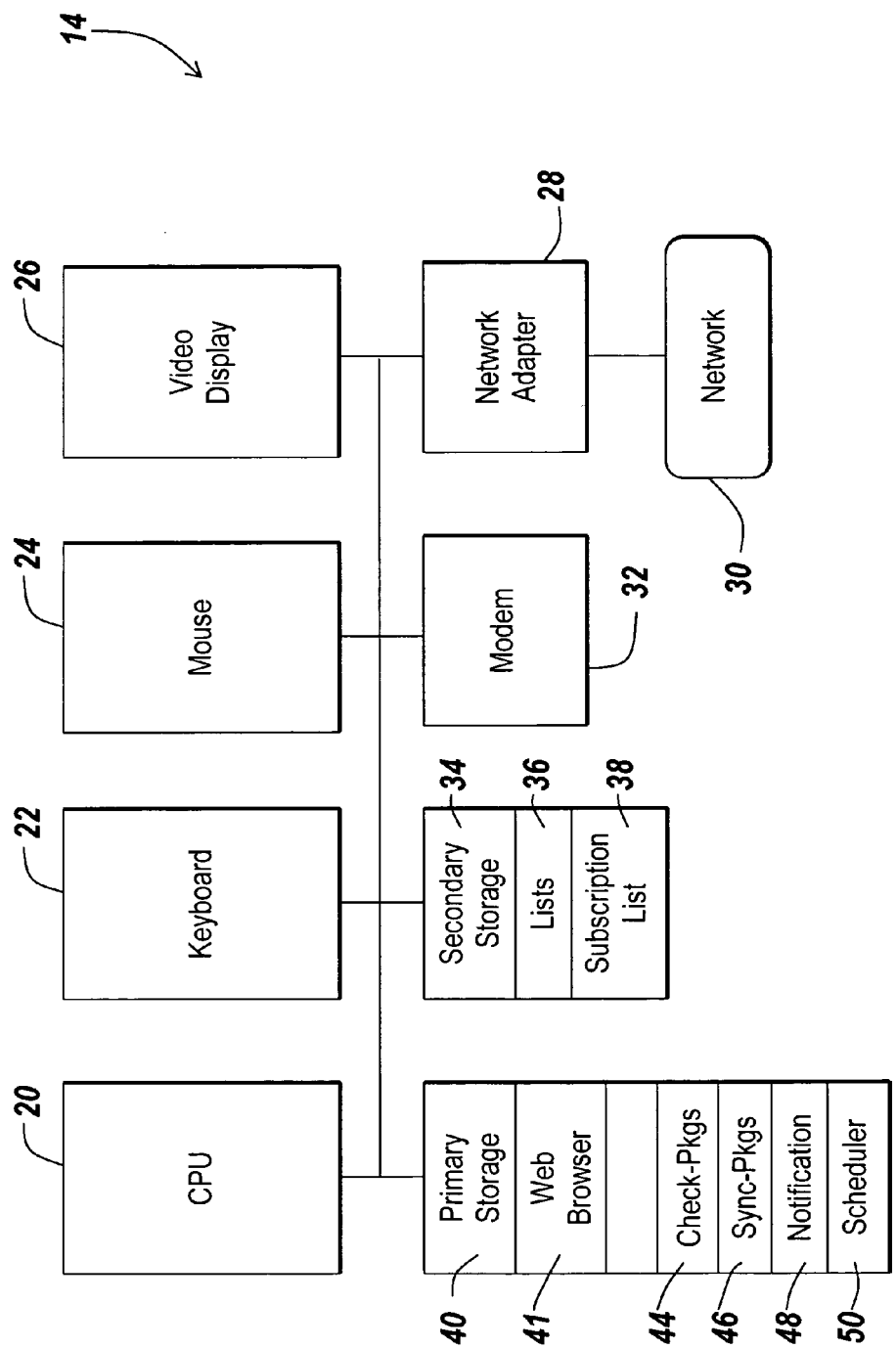
FIG. 2 illustrates an exemplary client computer system in more detail.

FIG. 2 depicts examples of a format for a client system 14. The client system 14 includes a central processing unit (CPU) for overseeing operations within the client system 14. The CPU 20 executes computer program instructions to perform activities. The client system 14 may includes input devices, such as a keyboard 22 and a mouse 24. The client system 14 may also include output devices, such as a video display 26. The client system 14 may include a network adapter 28 for interfacing the client system with a computer network 30. The client system 14 may contain a modem 32 for communicating with remote computing resources. The modem 32 may be realized as a conventional modem, a wireless modem or a cable modem, for example.

The client system includes both primary storage 40 and secondary storage 34. The storages 34 and 40 may include removable computer readable medium, including removable magnetic disks, optical disks and/or magneto-optical disks. The secondary storage 34 may hold a number of lists 36 (which will be described in more detail below) that are used in determining which packages to download and/or install. Secondary storage 34 may also hold a copy of a subscription list 38 that identifies the packages to which the client system subscribes (i.e. those packages for which the client system wants updates).

The primary storage 40 may hold a number of different types of programs and data. The primary storage may include a web browser 41 for enabling the client system 14 to communicate with web servers and, in general, to provide web-based access to remote computing resources. The primary storage 40 holds three modules 44, 46 and 48 that perform respective roles in updating packages on the client system 14. As will be described in more detail below, the check-pkgs module 44 is responsible for identifying what packages need to be updated and installed at the client system. The sync-pkgs module 46 is responsible for performing the updates, and the notification module 48 is responsible for generating notifications that notify the completion of updates.

The client system 14 may run an operating system, such as the Solaris™ operating system from Sun Microsystems, Inc. of Palo Alto, Calif. The operating system may include a scheduler 50 (e.g. Cron) that is responsible for scheduling activities within the client system 14. As will be described in more detail below, the scheduler may be responsible for triggering updates so that the packages that are installed on the client system 14 may be ensured to be current. The client system may include various transmission media for transmitting signals to perform desired operations.

Those skilled in the art will appreciate that the depiction of a client system 14 shown in FIG. 2 is intended to be merely illustrative and not limiting of the present invention. Each of the client systems 14 need not have the same configuration. Moreover, the present invention may be practiced with computer systems that include different components than those depicted in FIG. 2.

Figure 3:
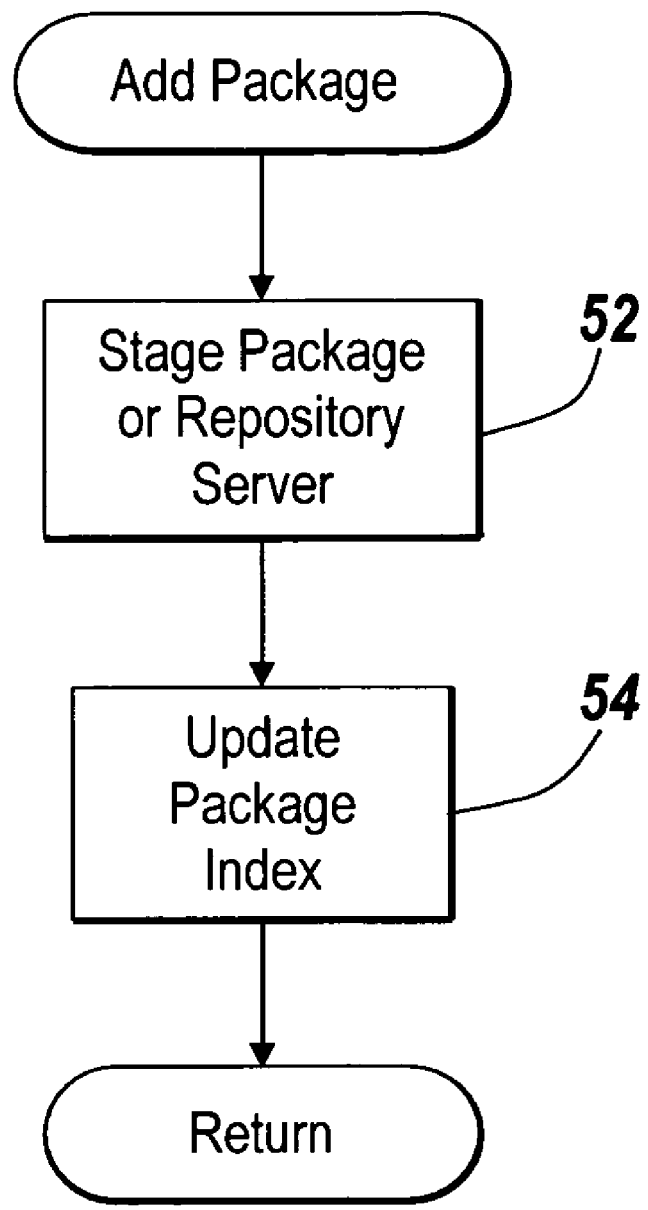
FIG. 3 is a flow chart illustrating the steps that are performed to add a package to the packages that are available for installation.

The global distribution mechanism of the illustrative embodiment facilitates the addition of packages so that the packages are available for installation. FIG. 3 depicts a flow chart of the steps that are performed to add a package. Initially, the package is staged on a repository 16 (step 52 in FIG. 3). The choice of repository for storing the package may be based upon a number of factors, including available storage capacity, proximity to subscriber client systems 14 and load balancing considerations. For example, a single package may be stored on multiple repositories 16, and a client system may dynamically choose what package to download based on current loads, as will be described in more detail below. The package index stored on the publishing master 12 is then updated to include a listing for the newly staged package (step 54 in FIG. 3). Conversely, the distribution mechanism facilitates the removal of packages by removing the packages from the index, and may entail deletion of the package from the repositories 16.

FIG. 4 depicts the logical format of the package index 60. The package index includes a number of entries where each entry is associated with a particular package. In FIG. 4, entries 70, 72, 74 and 75 are associated with separate packages. Each entry includes a name field 62 that identifies the name of the package (e.g. coyote). Each entry also includes a version field 64 that identifies the version of the package (e.g. 2.0). Each entry additionally includes a type field 66 that identifies the type of package (e.g. "O") and a location field 68 that identifies a location of the package (e.g. http://www.arizona.com/coyote). Multiple locations may be specified (see entry 75) where the package is stored at multiple locations.

The type field 66 may specify whether the package is a required update ("R"), an optional update ("O"), a patch update ("P") or a stealth update ("S"). A required update is a package that is flagged for update on any system that either does not currently have the package installed or that has a version lower than the version indicated in the package index field. An optional update is flagged for update on any system that has subscribed to the package and that does not have the package installed or has a version lower than the version indicated in the package index field. A patch update can either be a required package or an optional package. Required patch packages are by default installed on every system. Optional patch packages are only installed on client systems that subscribe to the patch. The "P" designator in the type field 66 may be followed by a hyphen and an optional package name. In such a case, the patch 11 be updated only if the package with the specified optional package name is currently installed and subscribed to by the client system. A stealth update is a required update to an optional package.

Figure 5:
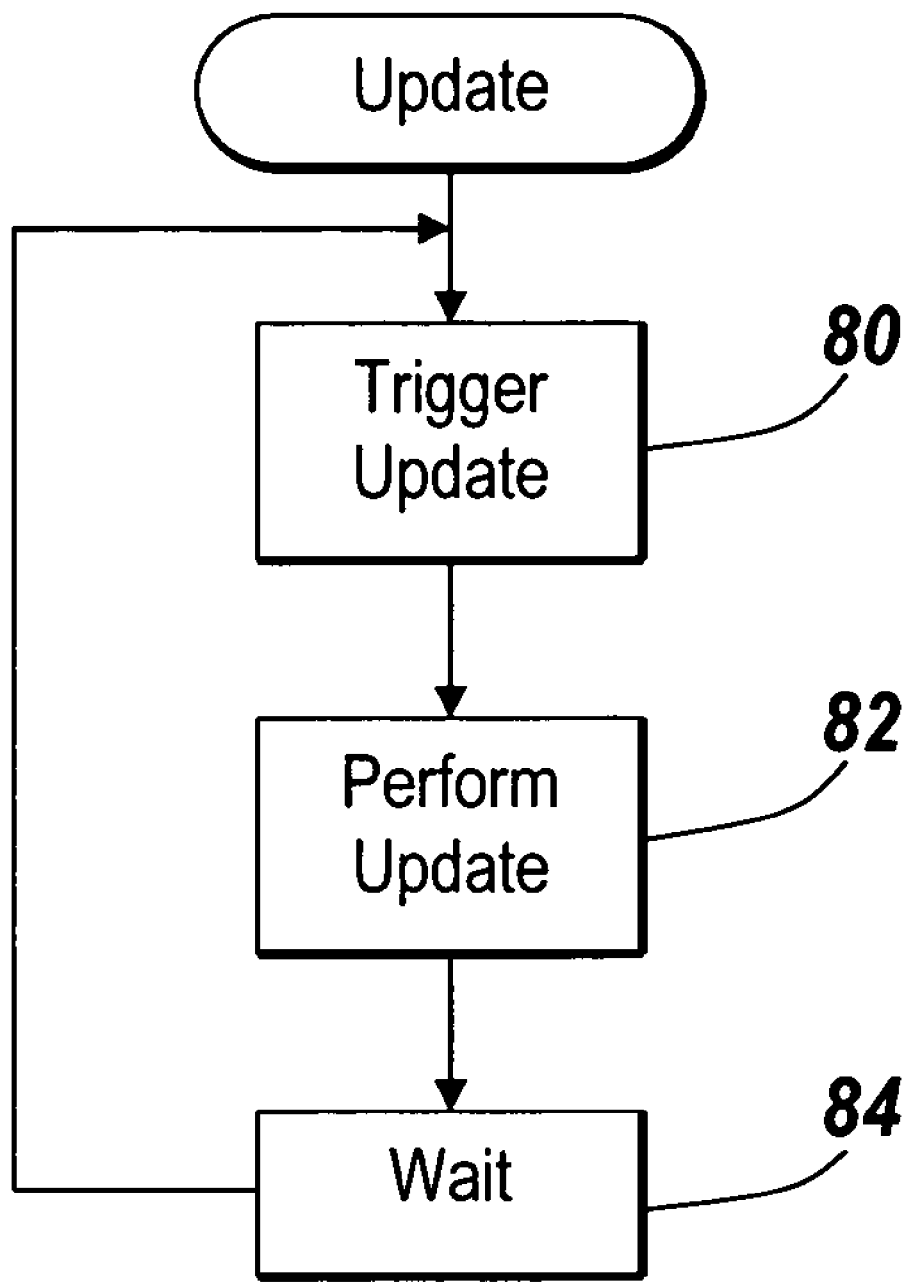
FIG. 5 is a flow chart illustrating the cycle of steps that is performed to keep client computer systems updated.

FIG. 5 is a flow chart illustrating in the steps that are performed to update packages on a given client system. Initially, the update is triggered (step 80 in FIG. 5). The update may be triggered at periodic intervals by the scheduler 50 or may be triggered in a different fashion. For example, the update may be triggered by a user explicitly requesting an update or by other events that indicate that update is required. The update is then performed to install packages as needed (step 82 in FIG. 5). In particular, the modules 44, 46 and 48 are executed. The system then waits (step 84 in FIG. 5) until an update is again triggered (see step 80 in FIG. 5).

Figure 6:
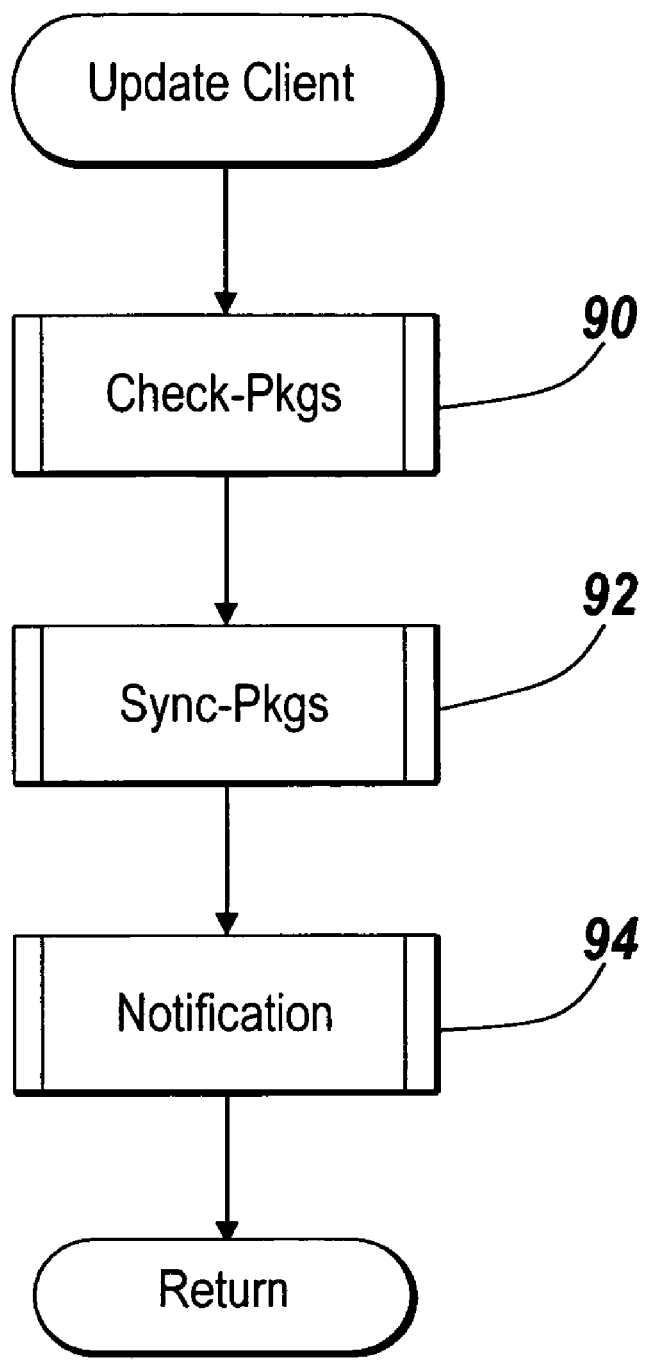
FIG. 6 is a flow chart illustrating the steps that are performed to update a single client computer system.
Figure 7:
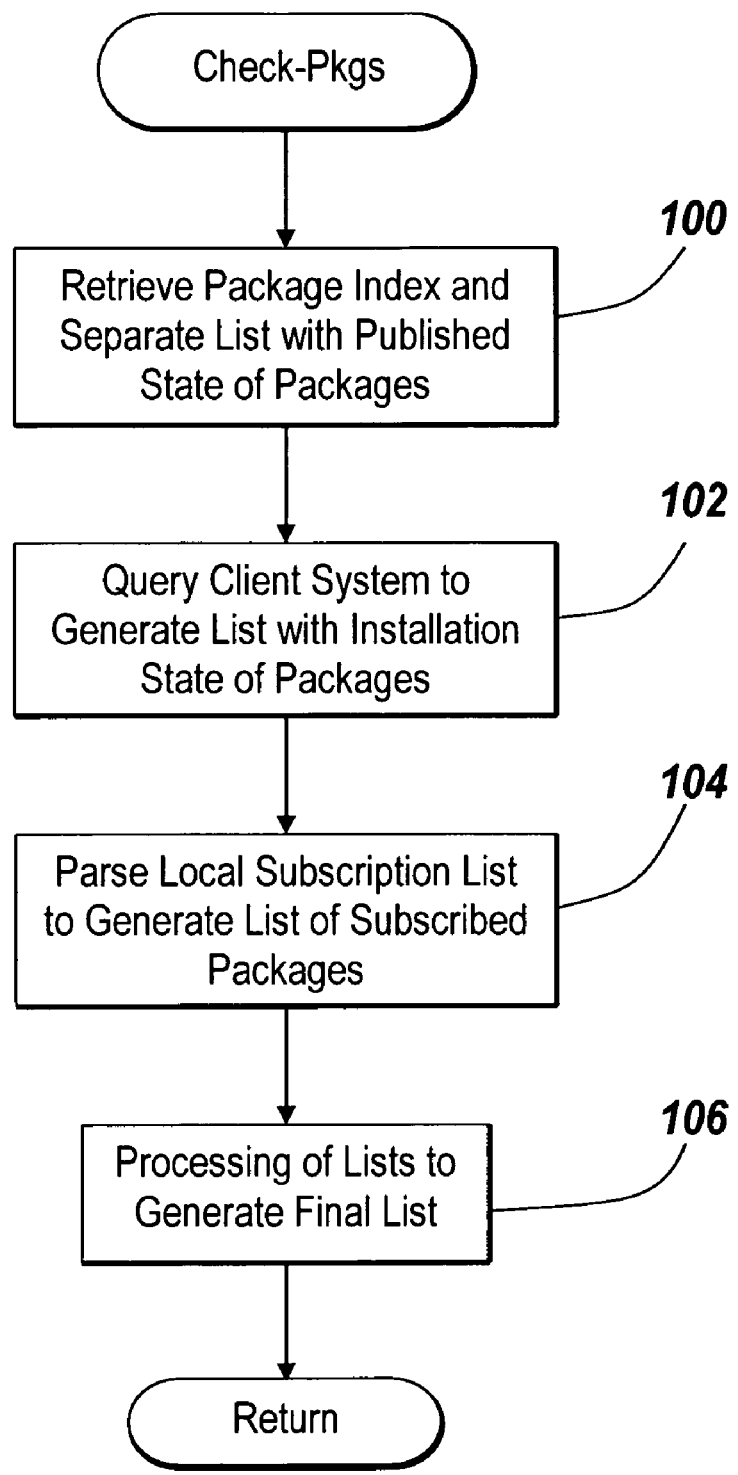
FIG. 7 is a flow chart illustrating the steps that are performed to identify what packages need to be updated on a given client computer system.
Figure 8:
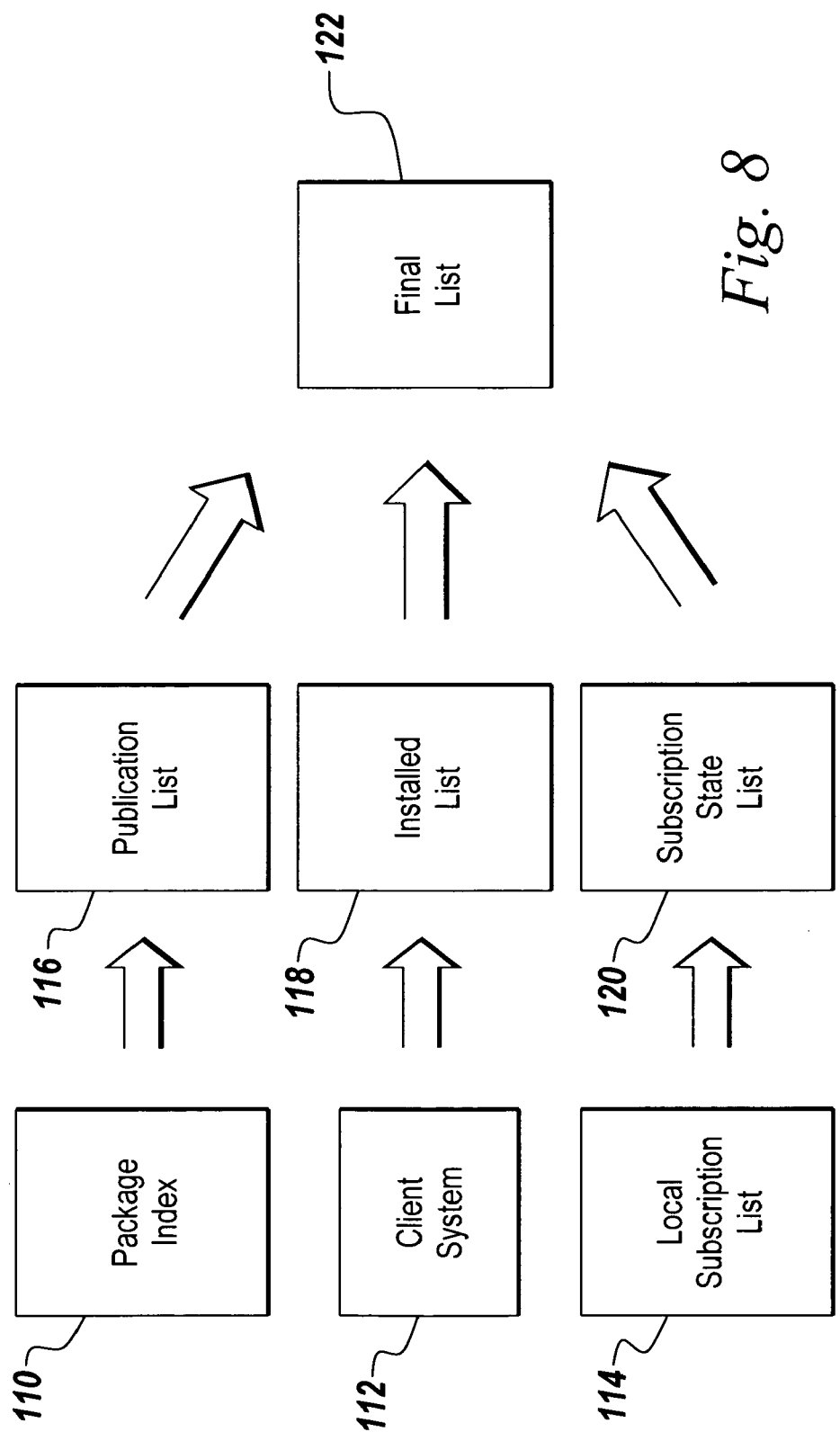
FIG. 8 illustrates how a list of packages that need to be updated is generated from other data.

FIG. 6 is a flow chart illustrating the steps that are performed to update a client system 14. Initially the check-pkgs module 44 is activated to determine what packages need to be updated (step 90 in FIG. 6). FIG. 7 is a flow chart that illustrates the steps that are performed by the check-pkgs module. Initially, a client system 14 retrieves the package index 60 from the publishing master 12 and generates a list of the published state of the packages (step 100 in FIG. 7). Thus, as shown in FIG. 8, the package index 110 is retrieved by the client system 14 and processed to generate a publication list 116. The resulting process list reflects the published state of all packages (i.e. a list of packages and versions). The client system then initiates a query to generate a list that identifies the state of all packages installed on the client system 14, including version information for these packages. As shown in FIG. 8, the client system 112 generates an installed list 118 that identifies the state of the packages installed on the system.

The client system examines the local subscription list 114 (FIG. 8) to generate a list of subscribed packages 120 (step 104 in FIG. 7). FIG. 8 depicts the format of the local subscription list 114. The local subscription list 114 is a serial listing of the packages to which the local system subscribes.

Those skilled in the art will appreciate that the subscription state list 120 may have a number of different formats and need not be organized as a list per se but may be organized as a set of records, a table or the like. Moreover, the lists may be combined into a single list or in different combinations of lists.

The lists 116, 118 and 120 are then processed to generate a final list 122 that identifies the packages that need to be installed to complete the update (step 106 in FIG. 7). Any required updates which are either not installed or have published versions higher than the currently installed packages will be included in the final list 122. Any optional packages which are either not installed or have published versions higher than the currently installed versions and exist in the local subscription list will also be included on the final list 122.

Figure 10:
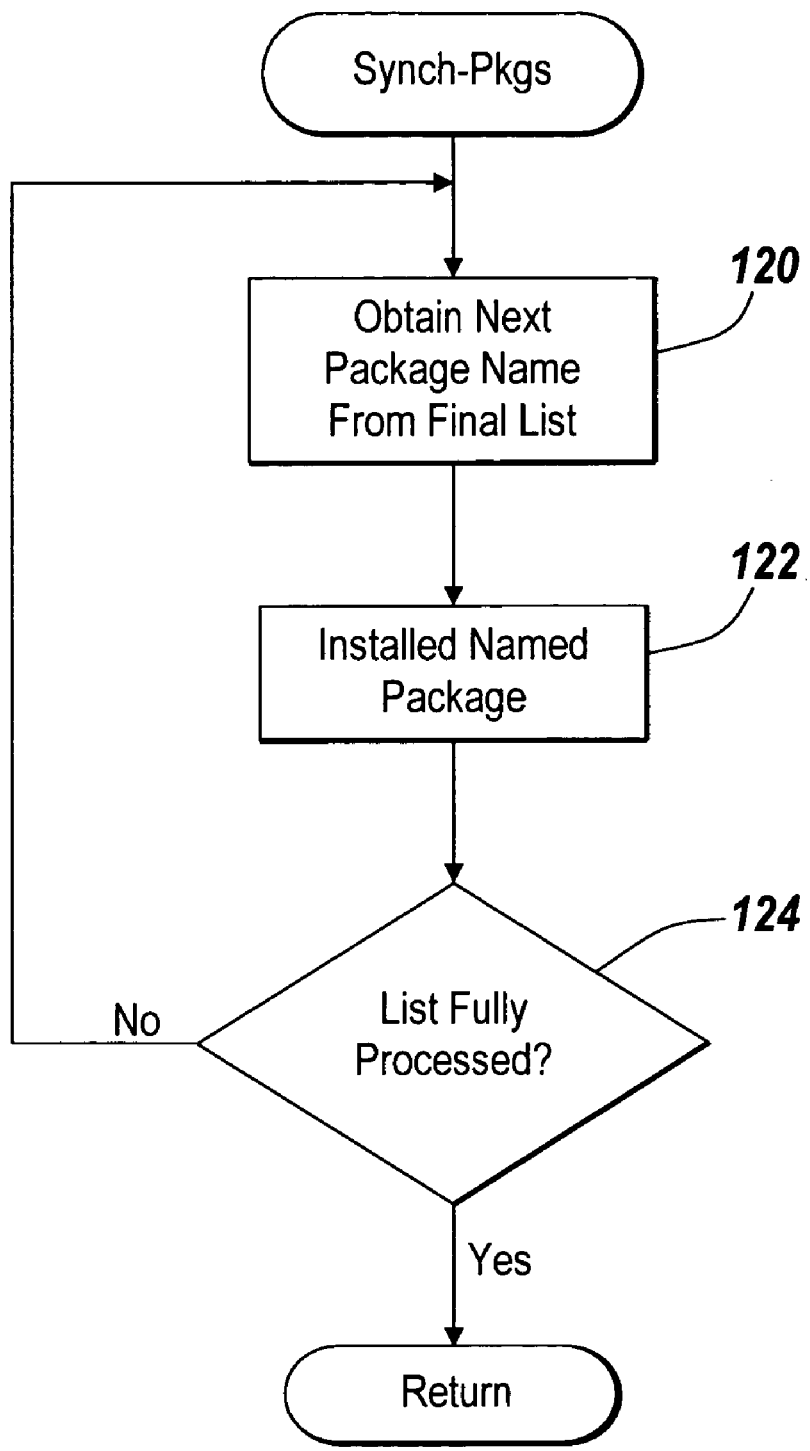
FIG. 10 illustrates the steps that are performed to update a given client computer system.

Once the check-pkgs module has completed generation of the final list 122 (see step 90 in FIG. 6). The sync-pkgs module is activated (step 92 in FIG. 6). FIG. 10 provides a flow chart of the steps performed by this module 46. The module 46 obtains the next package name from the final list (step 120 in FIG. 10) and installs the name package from the repository on which the package is located. As was mentioned above, the package index contains location information. The package may be installed using FTP or HTTP (step 122 in FIG. 10). This process continues in this fashion until the list is fully processed (see step 124 in FIG. 10). Thus, the packages are located on the repositories, downloaded to the client systems and installed.

Notifications are generated (step 94 in FIG. 6) to notify appropriate personnel via a desired channel (e.g. via email) that an update has happened. FIG. 11 depicts a format of a suitable format for a notification 130. A notification should identify the package name 132 that was installed at the client system 14. The notification 130 should also identify the repository server 144 from which the update was obtained and the notification 130 should include a status field 136 that indicates whether there were any errors or not.

Each of the client systems 14 may perform the update process separately. Alternatively, the client systems 14 may be triggered to perform updates by a master mechanism such that all client systems are updated at the same time.

Figure 12:
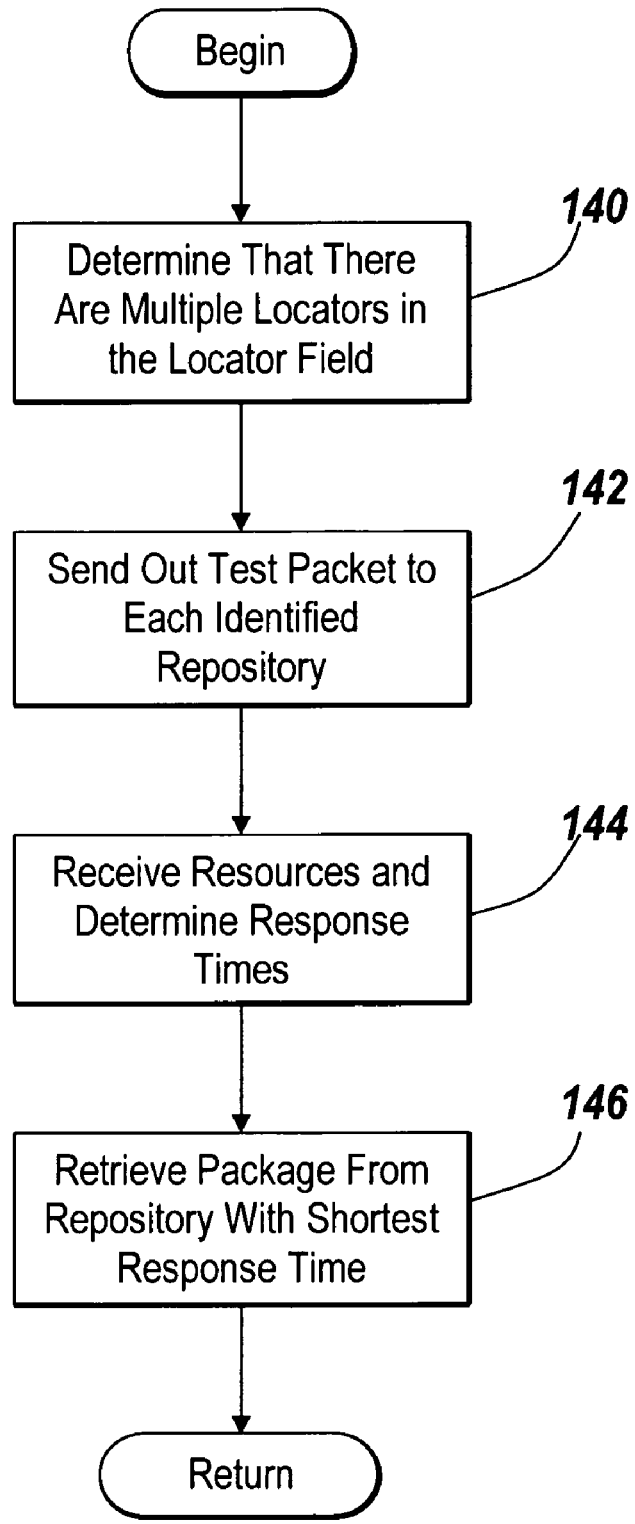
FIG. 12 is a flow chart illustrating the steps performed to dynamically determine a repository to use in retrieving a package for installation when the package is stored on multiple repositories.

The illustrative embodiment also facilitates dynamic load balancing. In particular, the illustrative embodiment may store a package on multiple repositories and download a copy of the package from one of the repositories based upon current load conditions. FIG. 12 is a flow chart illustrating the steps that are performed to realize such dynamic load balancing in the illustrative embodiment. Initially, the client system 14 accesses the package index 60 and determines that there are multiple location fields 68 (step 140 in FIG. 12). These locations are on separate repositories 16. The client system then takes steps to determine the respective loads on the repositories where the package is stored. Specifically, the client sends out a test package to each identified repository (step 142 in FIG. 12). The test package received by the respective repositories and returned. The responses are received at the client system for the repositories and based upon the time that has elapsed between when the test packet was sent out to the respective repositories and when the respective responses were received, the client system 14 determines response times for the respective repositories (step 144 in FIG. 12). The system retrieves the package from the repository with the shortest response time (step 146 in FIG. 12). It is presumed that the repository with the shortest response time is the least loaded and best able to fulfill the request.

The dynamic load balancing provided in the illustrative embodiment allows the strategic location repositories across the network. There is no need for the repository to be crafted for one particular client. The client chooses the repository that is best suited for the client needs. In addition, the scheme allows a server to go down or be services without fear of endangering the client systems 14.

Those skilled in the are will appreciate that the present invention may be practiced with implementations that use a different programmatic structure. The respective phases of the updates need not be performed by separate modules but rather may be performed by a single integrated program or by multiple disparate programs.

While the present invention has been described with reference to an illustrative embodiment thereof, those skilled in the art will appreciate that various changes in form and detail may be made without departing from the intended scope of the present invention as defined in the appended claims.

What is claimed is:

1. In a distributed system having a publishing master and a client system, a computer implemented method for distributing packages to various computer systems, said method comprising:

providing at the publishing master an index of available packages for loading by the client system, said packages being one of a computer program and a patch for a computer program;

storing at the client system data that identifies packages to which the client system subscribes;

programmatically accessing the index on behalf of the client system to identify at least one selected package for loading at the client system, said selecting using the information identifying packages that may be loaded at the client system, and the data that identifies packages to which the client system subscribes, said programmatic accessing occurring without user-participation; and loading the selected package at the client system, said package being received from the publishing master in response to a request from said client system.

2. The method of claim 1 wherein the selected package is loaded without registration of the client system with the publishing master.

3. The method of claim 1, comprising the further step of:

storing the selected package at a repository that is separate from the publishing master, said package being retrieved from said repository prior to loading.

4. The method claim 1 wherein the publishing master is a web server.

5. The method of claim 1 wherein said method of selecting a package for loading at the client system comprises the further step of:

comparing at least one of a version number and a release date for a package to which the client subscribes and which is loaded at the client system to at least one of a version number and a release date of at least one of said packages identified as available for loading at the publishing master.

6. The method of claim 1 wherein said method of selecting a package for loading at the client system comprises the further step of:

providing an identifier for each package listed as available for loading at said publishing master, said identifier indicating that an associated package is one of a required update and an optional update, said required update indicated as necessary for one of any client system without said package installed and a client system having one of said package installed bearing an earlier release date and package installed bearing a lower version number, said optional update indicated as necessary for one of any client system subscribing to said package and which does not have said package installed and a client system subscribing to the package and having one of said package installed bearing an earlier release date and package installed bearing a lower version number.

7. In a distributed system having a server and a client, a computer implemented method for distributing packages to various computer systems, said method comprising:

storing at the server an index identifying packages that may be installed at the client, said packages being one of a computer program and a patch for a computer program;

storing at the client data that identifies packages to which the client subscribes; and using the index identifying packages that may be installed at the client and the data that identifies packages to which the client subscribes to determine which of the packages are to be installed at the client, said determining comprising generating a list of packages that may be installed at the client to which the client wants to describe and which have not already been installed at the client.

8. The method of claim 7 further comprising installing the determined packages at the client, said package being received from the server in response to a request from said client.

9. The method of claim 7 further comprising providing data regarding what packages have already been installed at the client and using the data regarding what packages have already been installed in determining which of the packages are to be installed at the client.

10. The method of claim 7 wherein the index identifying packages that may be installed at the client includes information identifying names and version of the packages.

11. In a computer network having a server and a client, a method comprising the computer-implemented steps of:
(a) providing at the server an index regarding what packages are available for installation, said packages being one of a computer program and a patch for a computer program;
(b) providing at the client an itemization of packages to which the client subscribes; and
(c) with the client, repeating multiple times the following steps:
(i) programmatically accessing the index regarding what packages are available and accessing the itemization of packages to which the client subscribes to determine what selected packages to install, said programmatic accessing occurring without user-participation; and
(ii) installing selected packages at the client, said package being received from the server in response to a request from said client.

12. The method of claim 11 wherein steps (c)(i) and (c)(ii) are repeated at periodic intervals.

13. The method of claim 11 wherein steps (c)(i) and (c)(ii) are repeated upon demand by a user.

14. In a distributed system having a publishing master, at least one repository for holding packages and multiple client computer systems, said packages being at least one of a computer program and a patch for a computer program a computer implemented method comprising:
providing a package index at the publishing master, wherein the package index identifies names and versions of packages stored on the repository;
providing a subscription list at each client system, wherein each subscription list identifies the packages to which the client system subscribes; and
for each client system, at periodic intervals:
(i) programmatically identifying selected packages to be loaded by referencing the package index and the subscription list; said programmatic identifying occurring without user-participation; and
(ii) loading the selected packages at the client system, said package being received from the publishing master in response to a request from said client system.

15. The method of claim 14 wherein at least one of the packages that is loaded includes multiple patches.

16. A distributed system, comprising:
a publishing master holding an index of packages that are available for installation, said packages being at least one of a computer program and a patch for a computer program;
a repository for storing the packages that are available for installation; and
a client computer system for identifying selected packages among the packages indexed by the index of packages, obtaining the selected packages from the repository and installing the selected packages at the client computer system said identifying using information from a client-maintained subscription list of packages to which the client computer system subscribes, said obtaining of the selected packages being received from the publishing master occurring in response to a request from said client system.

17. The distributed computer system of claim 16 further comprising an additional repository for storing at least a portion of the packages that are available for installation.

18. The distributed computer system of claim 16 further comprising an additional client computer system for identifying a subset of the packages indexed by the index of packages, obtaining the subset of packages from repository and installing the subset of packages at the additional client computer system.

19. In a distributed system having a publishing master with an index of packages available for installation and a client system, said packages being at least one of a computer program and a patch for a computer program, a computer implemented method performed by the client system comprising:
requesting at least a portion of the index from the publishing master;
receiving at least a portion of the index from the publishing master in response to the request;
identifying packages that are already installed at the client;
processing the received portion of the index to identify a selected package to install; said processing using information about the identified packages already installed on the client system; and
obtaining a copy of the selected package in response to a request from the client system.

20. The method of claim 19 further comprising the step of installing the package at the client system.

21. The method of claim 19 wherein the selected package is obtained without registration of the client system with the publishing master.

22. The method of claim 19 wherein the selected package contains a patch.

23. The method of claim 19 wherein the selected package contains a document.

24. In a distributed system having a publishing master having an index of packages available for installation and a client system, said packages being at least one of a computer program and a patch for a computer program, a computer-readable medium holding computer-executable instructions for performing a method performed by the client system comprising:
requesting at least a portion of the index from the publishing master;
receiving at least a portion of the index from the publishing master in response to the request;
identifying packages that are already installed at the client;
processing the received portion of the index to identify a selected package to install; said processing using information about the identified packages already installed on the client; and
obtaining a copy of the selected package in response to a request from the client.

25. The storage medium of claim 24 wherein the selected package is obtained without registration of the client system with the publishing master.

26. In a distributed system having a publishing master and a client system, a medium holding computer executable steps for a method, said method comprising:
providing at the publishing master an index of available packages for loading, said packages being one of a computer program and a patch for a computer program;
storing at the client system data that identifies packages to which the client system subscribes;

programmatically accessing the index on behalf of the client system to identify at least one selected package for loading at the client system, said selecting using the information identifying packages that may be loaded at the client system, and the data that identifies packages to which the client system subscribes, said programmatic accessing occurring without user-participation; and loading the selected package at the client system, said package being received from the publishing master in response to a request.

27. The medium of claim 26 wherein the selected package is loaded without registration of the client system with the publishing master.

28. The medium of claim 26 wherein said method of selecting a package for loading at the client system comprises the further step of:

comparing at least one of a version number and a release date for a package to which the client subscribes and which is loaded at the client system to at least one of a version number and a release date of at least one of said packages identified as available for loading at the publishing master.

29. The medium of claim 26 wherein said method of selecting a package for loading at the client system comprises the further step of:

providing an identifier for each package listed as available for loading at said publishing master, said identifier indicating that an associated package is one of a required update and an optional update, said required update indicated as necessary for one of any client system without said package installed and a client system having one of said package installed bearing an earlier release date and package installed bearing a lower version number, said optional update indicated as necessary for one of any client system subscribing to said package and which does not have said package installed and a client system subscribing to the package and having one of said package installed bearing an earlier release date and package installed bearing a lower version number.

\* \* \* \* \*